United States Patent [19]

Smith et al.

[11] Patent Number: 4,666,717

[45] Date of Patent: * May 19, 1987

[54] LONG LIFE SEMI-ARTIFICIAL BAIT

[75] Inventors: Malcolm S. Smith, Beaumont; Colastie J. Daigle, Orange, both of Tex.

[73] Assignee: E. I. Du Pont de Nemours and Company, Wilmington, Del.

[*] Notice: The portion of the term of this patent subsequent to Mar. 18, 2003 has been disclaimed.

[21] Appl. No.: 838,635

[22] Filed: Mar. 6, 1986

Related U.S. Application Data

[63] Continuation-in-part of Ser. No. 754,156, Jul. 12, 1985, Pat. No. 4,576,821.

[51] Int. Cl.$^4$ .................... A23L 1/325; A01K 85/00
[52] U.S. Cl. ......................... 426/1; 43/44.99
[58] Field of Search ............... 426/1; 43/44.99; 523/102

[56] References Cited

U.S. PATENT DOCUMENTS

| | | | |
|---|---|---|---|
| 2,979,778 | 4/1961 | Fitz Simons | 18/58 |
| 3,410,689 | 11/1968 | Nathan | 99/3 |
| 3,579,895 | 5/1971 | Orn | 43/17.6 |
| 3,684,519 | 8/1972 | Combs | 99/3 |
| 3,846,931 | 11/1974 | Block et al. | 43/42.53 |
| 3,854,234 | 12/1974 | Hardin | 426/1 |
| 3,875,302 | 4/1975 | Inoue | 426/1 |
| 4,202,905 | 5/1980 | Asai | 426/1 |
| 4,245,420 | 1/1981 | Carr | 43/42.06 |
| 4,463,018 | 7/1984 | Carr | 426/1 |
| 4,513,657 | 4/1985 | Melancon | 99/472 |
| 4,576,821 | 3/1986 | Smith et al. | 426/1 |

FOREIGN PATENT DOCUMENTS 0137748  4/1985  European Pat. Off. .

*Primary Examiner*—George Yeung

[57] ABSTRACT

Fish and crustacean bait consisting essentially of (a) from about 2 to about 50 wt. % of a water insoluble polymer having a melting point below about 110° C. (e.g., polyamides and copolymers of ethylene with at least one ethylenically unsaturated comonomer); (b) from about 45 to about 98 wt. % of plant derived particulate attractant; and (c) from 0 to about 20 wt. % of an edible oil or molasses.

15 Claims, No Drawings

LONG LIFE SEMI-ARTIFICIAL BAIT

CROSS REFERENCE TO RELATED APPLICATION

This application is a continuation-in-part of Ser. No. 754,156, filed July 12, 1985, now U.S. Pat. No. 4,576,821.

BACKGROUND OF THE INVENTION

This invention relates to crustacean bait and more particularly it relates to long life semi-artificial bait containing polymer, plant derived particulate attractant and optionally an edible oil or molasses.

DESCRIPTION OF THE PRIOR ART

Crustacea (crawfish, crabs and lobsters) are normally harvested by means of a wire trap baited with an attractant—fish, fish meal, fish oil, animal slaughterhouse products, dried milk, eggs, etc. The trap is normally run on a daily basis during which the crustacea are removed, the trap rebaited and the trap reset.

The two major types of bait used to catch crawfish are semi-artificial and fish. Semi-artificial baits are a blend of natural fillers, fish meal and fish oil, held together with a water soluble paste. Baits of this type disappear after 12–24 hours in the trap and must be replenished daily. The use of fish as a bait for crawfish is declining because of the overall cost and quality variability of fish. Both fish and semi-artificial baits are expensive and represent a significant expense in the harvesting of crawfish. They are difficult to store and have a short shelf life under ambient conditions. A need exists for a long life semi-artificial bait (1) capable of catching crawfish over an extended period of time without rebaiting, and (2) with a reasonable ambient storage life.

U.S. Pat. No. 3,410,689 discloses fish or crustacean bait formed of a plastic foam, e.g. polyurethane foam, having a fish attractant integrally mixed within the solid plastic structure. The patentee expressly distinguishes his bait from one made by suspending a substance within the interstices of a porous object such as a foamed plastic or sponge. The bait is disclosed to be manufactured by well known conventional methods for forming foam plastics such as admixing two reactants which polymerize and yield a gaseous product which affects the foam structure. A third ingredient, the fish attractant, is mixed with one or both of the conventional reactants prior to the chemical reaction or polymerization. Fish attractants disclosed are "dehydrated fish meal, fish oil, dry slaughterhouse waste products, powdered fish, egg, dried milk products, molasses, . . . ". The bait is formed so as to break up into small particles in water which dispense into the water and are carried away by the natural flow of water.

U.S. Pat. No. 3,684,519 describes a bait of finely ground organic tissue particles in polyacrylamide gel. In water this gel swells and allows the odor of the attractant to be released. The bait is disclosed to be useful especially for crab fishing in crab pots. This type of bait permits storage without refrigeration. Acrylamide gel was used because of its compatability with protein. In water the gel swells, the tissue decays to give off odor, but is still physically protected. The organic tissue is finely ground, for example, in a blender, is mixed into the gel solution and is gelled at room temperature. The acrylamide "reforms the cell walls of the tissue". Prolonged exposure to open air will cause dehydration of the gel. However, the bait can remain immersed in fresh water for one month and still remain attractive to crabs. More rapid degradation occurs in salt water but is still good for 48 hours versus 5 hours for fresh bait. The gel is distasteful to crabs so it is not eaten, the crabs spit it out.

U.S. Pat. No. 3,875,302 discloses bait made from aqueous gels of polyvinyl alcohol. The bait is made by freezing, melting and refreezing the aqueous PVA. Freezing determines the micellar structure, elasticity, and water resistance. Fish oil is used as a non-solvent to make the PVA assume a globular form. The composition is disclosed to be suitable as carriers for bait, fertilizer, etc. or used as bait by addition of attractant, for example, fish powder (30–200 wt. %). No degradation is reported in the water, however, it is highly swollen by the water. The odor continues for about 10 days. It can be used for bait in crab baskets. The composition consists of 100 parts of 10% aqueous solution of PVA, 15 parts of mackerel, 10 parts of clay, and 0.2 parts of dye. The texture of the bait is similar to that of natural bait.

European Patent Application No. 84306264.7, published on Apr. 17, 1985 (Publication No. 0137748) discloses an artificial bait for fish, which bait is capable of the prolonged release of an attractant for said fish into surrounding water. This artificial bait comprises (a) a polymeric material comprising a water-soluble cellulose ether or polyvinyl alcohol and a plasticizer therefore, said polymeric material having dispersed therein (b) an attractant for fish which attractant is capable of being released in active form from said polymeric material upon contacting the artificial bait with water.

The baits are disclosed to be suitable for all forms of fishing such as sport fishing, commercial fishing, ocean fishing and fresh water fishing, as well as for catching shell fish and crustaceans such as lobsters, crabs, shrimp and the like. Preferred attractants disclosed are liquefied fish or other marine products, fish oils, anise, amino acids or synthetic attractants.

SUMMARY OF THE INVENTION

According to the present invention, there is provided a fish and crustacean bait consisting essentially of (a) from about 2 to about 50 wt. % of a water insoluble polymer having a melting point below about 110° C. selected from the group consisting of polyamides and copolymers of ethylene with from about 15 to about 45 wt. % of at least one ethylenically unsaturated comonomer;

(b) from about 45 to about 98 wt. % of attractant selected from the group consisting of fish meal and powdered fish; and (c) from 0 to about 20 wt. % of edible oil or molasses.

As used herein the term "consisting essentially of" means that the named ingredients are essentially; however, other ingredients that do not prevent the advantages of the present invention from being obtained can also be included.

DETAILED DESCRIPTION OF THE INVENTION

It has been found that the combination of certain polymers and plant derived meal and optionally edible oil or molasses, results in a long life semi-artificial bait suitable for catching crustacea and fish.

Suitable polymers have the common characteristics of being relatively soft, low melting, water insoluble and able to accept high filler loadings, such as plant derived meal and oil or molasses attractants while retaining satisfactory physical strength properties (perhaps due to their polar comonomer content). The polymer must be soft enough to permit the crustacea to "chew" on it, yet be strong enough to remain substantially intact over a sufficiently long period of time. Since the bait is best made by an extrusion process, the polymer must melt and be processible at a low enough temperature (about 90°–110° C.) such that the plant products oil or molasses will not be degraded during processing.

Thus suitable polymers are water insoluble polymers having a melting point below about 110° C. selected from the group consisting of polyamides and copolymers of ethylene with at least one ethylenically unsaturated comonomer. Examples of such polymers are ethylene/n-butyl acrylate/carbon monoxide (E/n-BA/CO), ethylene/methacrylic acid (E/MAA), E/n-BA/MAA, E/nBA/GMA (glycidyl methacrylate), E/MAA/VA (vinyl acetate), E/VA/CO, and E/iBA (i-butylacrylate)/MAA, and polyamides, such as "Macromelt" 6301 hot melt adhesive available from Hendel Corporation.

Generally the ethylenically unsaturated comonomer in the ethylene copolymer is present in an amount of from about 15 to about 45 weight percent. Increasing the amount of ethylenically unsaturated comonomers in a given ethylene copolymer increases copolymer melting point, decreases attractant solubility and increases blend hardness. A compromise of these properties is necessary in the various polymers to produce acceptable baits.

Preferably the ethylenically unsaturated comonomer is present in an amount of from about 20 to about 40 weight percent, and most preferably from about 25 to about 35 weight percent.

The most preferred ethylene copolymer is ethylene/vinyl acetate.

The amount of polymer in the bait of the present invention is from about 2 to about 50 weight percent, preferably from about 2.5 to 25 and most preferably from about 4 to about 15 weight percent.

The second essential ingredient is an attractant such as meal or powdered plant derived material.

The plant derived attractant can be grain, processed grain products, forage products, farm products, (beans, rice, cotton seed, etc.) optionally up to 50 weight percent fish meal can be included in the composition. The amount of attractant in the bait of the present invention should be from about 50 to about 98 weight percent, preferably from about 75 to about 97.5 and most preferably from about 85 to about 96 weight percent.

Optionally an edible oil such as peanut, cotton seed, corn or fish oil or molasses can also be incorporated in the bait of the present invention. The amount of edible oil or molasses present can be from 0 to about 20 percent by weight, preferably from 0 to about 10 and most preferably from about 2 to about 10 weight percent.

In another aspect of the invention fish meal is used as the attractant in the amounts described above for the plant derived attractant, the polymer is used as described above, and 2 to 20 percent by weight molasses, and preferably 2 to 10 percent molasses is included in the formulation.

The semi-artificial bait of the present invention is suitable for catching crab, lobster, and fish as well as crawfish.

The semi-artificial bait of the present invention has the advantages of (1) reduced bait cost because of the ability of the bait to catch crawfish for in excess of four days as compared to currently used commercial baits that need to be replaced daily; (2) reduced labor cost since the bait of the present invention allows the farmer to run his traps every two, three, four or even longer days rather than every day as is required with the currently used commercial baits; and (3) an ambient storage life in excess of one year.

The semi-artificial bait of the present invention and its optimum formulation is unique in its ability to catch crawfish for over a period of several days at a rate similar to the commercial baits currently in use which latter being water soluble must be replaced daily. The present invention bait is rendered insoluble by the polymer ingredient thereof resulting in an effective, useful life of several days.

A slow diffusion of attractant occurs which is accelerated by the feeding pressure of the crustacea on the bait. The optimum bait then becomes one that has the best catch rate, life, processibility and economics.

The following examples serve to illustrate the present invention. All parts, percentages and proportions are by weight unless otherwise indicated.

EXAMPLES

Compositions of polymer, attractant, and optionally edible oil or molasses were dry blended by tumbling for about 15 minutes. This blend was fed to a 2½" (63.5 mm) diameter extruder in which the breaker plate and screen pack were removed. A rapid compression screw was used, with a 20.6/1 L/D ratio, 1041 mm in length with a 267 mm mixing torpedo on the end. Melt temperature was maintained around 90°–110° C. A typical temperature profile for a blend containing ethylene-vinyl acetate copolymer was:
Zone 1: 60° C.
Zone 2: 77° C.
Zone 3: 85° C.
Zone 4: 90° C.
Melt temperature: 95° C. (by probe)

The blend was extruded through a heated pipe, 30 cm long by 35 mm inside diameter (dimensions not critical) to produce a continuous rope. Rope lengths of about 13 cm were air cooled. Since the extruded rope was air cooled, melt temperature was maintained as low as possible, consistent with good extrusion.

EXAMPLE 1

A composition containing 5% ethylene/vinyl acetate copolymer (33% vinylacetate, melt index 43), 85% of a commercially available crawfish bait composed of grain products, processed grain by-products and animal products which was ground to a powder in a Wiley Mill, and 10% fish oil was prepared. Extrusion at a melt temperature of 93° C. resulted in formation of excellent rope.

The resulting bait was tested for six days opposite a control of fish and a control of the same commercially available crawfish bait. The bait of the invention lasted for 6 days and averaged 0.65 lb. catch per day. The fish control which was rebaited daily averaged 0.93 lb. catch per day and the commercially available crawfish bait control which was rebaited daily averaged 0.70 lb. per day.

EXAMPLE 2

A composition containing 5% of the copolymer used in Example 1, 10% soybean oil and 85% soybean meal was prepared as described in Example 1. The resulting bait had a trap life of greater than seven days, was tested for six days opposite a control of fish and averaged 0.36 lb. catch of crawfish per day. The fish control was rebaited daily and averaged 0.77 lb. of catch per day.

EXAMPLE 3

A composition containing 5% of the copolymer used in Example 1, 10% soybean oil and 85% of the commercially available crawfish bait used in Example 1, was prepared as in Example 1. The resulting bait had a trap life of greater than seven days and was tested opposite a control of fish for six days and averaged 0.48 lb. of catch of crawfish per day. The fish control was rebaited daily and averaged 0.77 lb. of catch per day.

EXAMPLE 4

A composition containing 85% ground Lone Star Range Cubes (cattle feed composed of grain products, plant protein, processed grain by-products, forage products and added salts), 10% soybean oil, and 5% of the copolymer used in Example 1 was prepared as in Example 1. The resulting bait had a trap life of greater than seven days and was tested for six days opposite a control of fish and averaged 0.34 lb. catch of crawfish per day. The fish control averaged 0.77 lb. of catch per day.

EXAMPLE 5

A composition containing 5% of the copolymer used in Example 1, 85% fish meal, 8% soybean oil and 2% molasses was prepared as described in Example 1. The resulting bait had a trap life of about five days, was tested for six days opposite a control of fish and averaged 0.58 lb. catch per day. The fish control was rebaited daily and averaged 0.63 lb. of catch of crawfish per day. Another control in which the molasses and soybean oil was replaced with fish oil averaged 0.45 lb. catch per day.

EXAMPLE 6

A composition containing 5% of the copolymer used in Example 1, 10% molasses and 85% fish meal was prepared as described in Example 1. The resulting bait had a trap life of greater than 7 days (estimated 9 days), was tested opposite a control of fish and averaged 0.55 lb. catch of crawfish per day. The fish control averaged 0.63 lb. catch per day and was rebaited daily.

We claim:

1. A composition useful as fish and crustacean bait consisting essentially of
   (a) from about 2 to about 50 wt. % of a water insoluble polymer having a melting point below about 110° C. selected from the group consisting of polyamides and copolymers of ethylene with from about 15 to about 45 wt. % of at least one ethylenically unsaturated comonomer;
   (b) from about 45 to abut 95 wt. % of a plant derived particulate attractant; and
   (c) from about 0 to about 20 wt. % of edible oil or molasses.

2. The composition of claim 1 wherein the polymer is a copolymer of ethylene selected from the group consisting of ethylene/vinyl acetate, ethylene/n-butyl acrylate/carbon monoxide, ethylene/n-butyl acrylate/methacrylic acid, ethylene/n-butyl acrylate/glycidyl methacrylate, ethylene/methacrylic acid/vinyl acetate, ethylene/methacrylic acid, ethylene/i-butylacrylate/methacrylic acid, and ethylene/vinyl acetate/carbon monoxide.

3. The composition of claim 2 wherein the comonomer in the ethylene copolymer is present in an amount of from about 20 to about 40 wt. %.

4. The composition of claim 1 wherein the polymer is present in an amount of from about 2.5 to about 25 wt. %.

5. The composition of claim 1 wherein the attractant is present in an amount of from about 75 to about 97.5 wt. %.

6. The composition of claim 1 wherein the edible oil or molasses is present in an amount of from 0 to about 10 wt. %.

7. The composition of claim 2 wherein the polymer is ethylene/vinyl acetate.

8. The composition of claim 7 wherein the polymer is present in an amount of from about 4 to about 15 wt. %; the attractant is present in an amount of from about 85 to about 96 wt. %; and the edible oil or molasses is present in an amount of from 2 to about 10 wt. %.

9. A composition useful as fish and crustacean bait consisting essentially of
   (a) from about 2 to about 50 wt. % of a water insoluble polymer having a melting point below about 110° C. selected from the group consisting of polyamides and copolymers of ethylene with from about 15 to about 45 wt. % of at least one ethylenically unsaturated comonomer;
   (b) from about 45 to about 96 wt. % of a fish or plant derived particulate attractant; and
   (c) from 2 to abut 20 wt. % of molasses.

10. The composition of claim 9 wherein the polymer is a copolymer of ethylene selected from the group consisting of ethylene/vinyl acetate, ethylene/n-butyl acrylate/carbon monoxide, ethylene/n-butyl acrylate/methacrylic acid, ethylene/n-butyl acrylate/glycidyl methacrylate, ethylene/methacrylic acid/vinyl acetate, ethylene/methacrylic acid, ethylene/i-butylacrylate/methacrylic acid, and ethylene/vinyl acetate/carbon monoxide.

11. The composition of claim 10 wherein the comonomer in the ethylene copolymer is present in an amount of from about 20 to about 40 wt. %.

12. The composition of claim 11 wherein the polymer is present in an amount of from about 2.5 to about 25 wt. %.

13. The composition of claim 12 wherein the attractant is present in an amount of from about 75 to about 98.5 wt. %.

14. The composition of claim 12 wherein the polymer is ethylene/vinyl acetate.

15. The composition of claim 14 wherein the polymer is present in an amount of from about 4 to about 15 wt. %; and the attractant is present in an amount of from about 85 to about 94 wt. %.

* * * * *